United States Patent
Iyer et al.

(10) Patent No.: US 11,928,131 B2
(45) Date of Patent: Mar. 12, 2024

(54) SYNCHRONIZED ACTIVATION OF DATASETS IN MULTICLOUD COMPUTING ENVIRONMENT

(71) Applicant: International Business Machines Corporation, Armonk, NY (US)

(72) Inventors: Sreekanth Ramakrishna Iyer, Bangalore (IN); Rakesh Shinde, Pune (IN); Ram Ravishankar, Irvine, CA (US); Harish Bharti, Pune (IN); Grigorij Kaplan, Vilnius (LT); Alberto Eduardo de Queiroz Dias, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 17/449,026

(22) Filed: Sep. 27, 2021

(65) Prior Publication Data
US 2023/0096966 A1 Mar. 30, 2023

(51) Int. Cl.
*G06F 16/27* (2019.01)
(52) U.S. Cl.
CPC .................. *G06F 16/275* (2019.01)
(58) Field of Classification Search
None
See application file for complete search history.

(56) References Cited

U.S. PATENT DOCUMENTS

| | | | |
|---|---|---|---|
| 9,659,077 B2 | 5/2017 | Chen | |
| 10,482,066 B2 * | 11/2019 | Shah | G06F 3/065 |
| 10,503,427 B2 * | 12/2019 | Botes | G06F 11/2094 |
| 10,917,471 B1 * | 2/2021 | Karumbunathan | G06F 3/064 |
| 11,089,105 B1 * | 8/2021 | Karumbunathan | G06F 3/065 |
| 11,409,708 B2 * | 8/2022 | Shah | G06F 16/122 |

(Continued)

FOREIGN PATENT DOCUMENTS

WO 2019047479 A1 3/2019

OTHER PUBLICATIONS

Mell, et al., "The NIST Definition of Cloud Computing", National Institute of Standards and Technology, Special Publication 800-145, Sep. 2011, 7 pages.

(Continued)

*Primary Examiner* — Hau H Hoang
(74) *Attorney, Agent, or Firm* — Michael A. Petrocelli

(57) ABSTRACT

Datasets can be synchronized across cloud-based computer environments using computer systems. A data map can be generated for source datasets for a plurality of computing environments, respectively, and an activation function can be determined based on the data map, for simultaneously activating a new dataset of a source system from one of the plurality of computing environments. A generation ID (identification) can be shared from the source system with one or more computing environments of the plurality of the computing environments, in response to receiving the activation function. The new dataset of the source system can be replicated across the one or more computing environments. A data synchronization trigger can be activated, using a synchronization coordinator module of the computer, and the data synchronization can be completed across the plurality of computing environments.

20 Claims, 9 Drawing Sheets

(56) References Cited

U.S. PATENT DOCUMENTS

| | | | | |
|---|---|---|---|---|
| 2011/0145693 A1* | 6/2011 | Mutic | ............... | G16H 30/40 |
| | | | | 715/233 |
| 2013/0339643 A1 | 12/2013 | Tekade | | |
| 2017/0316029 A1* | 11/2017 | Shah | ............... | G06F 16/122 |
| 2018/0365264 A1 | 12/2018 | Chung | | |
| 2020/0073855 A1* | 3/2020 | Shah | ............... | G06F 3/0605 |
| 2021/0243255 A1* | 8/2021 | Perneti | ............ | G06F 11/108 |
| 2021/0271692 A1* | 9/2021 | Kumar | ........... | G06F 11/2058 |
| 2022/0382484 A1* | 12/2022 | Shah | ............... | G06F 3/0605 |

OTHER PUBLICATIONS

Steiu, et al., "What is SQL Data Sync for Azure?", Aug. 20, 2019, Microsoft Azure documentation, 16 pages, <https://docs.microsoft.com/en-us/azure/azure-sql/database/sql-data-sync-data-sql-server-sql-database>.

* cited by examiner

SYNCHRONIZED ACTIVATION OF DATASETS IN MULTICLOUD COMPUTING ENVIRONMENT

BACKGROUND

The present disclosure relates to synchronization of datasets across cloud-based computer environments.

In multicloud computer environments, data can be synchronized across legacy and/or on-premises and cloud environments. Traditional data synchronization products can work on specific technologies or content. Data replication techniques can propagate data from one source or environment to another. One issue with existing solutions for synchronizing data across cloud environments, is that current techniques cannot guarantee simultaneously activation of datasets on multiple environments. The target environments can lag behind a source environment, at-least by a few microseconds. For example, in a batch jobs that creates large files in one environment, it can take a few minutes for other replicated environments to be in sync with a target environment. Also, a client does not have control for selecting which dataset needs to be enabled at a time on each environment.

SUMMARY

The present disclosure recognizes the shortcomings and problems associated with current techniques for synchronization of datasets across cloud-based computer environments. The present invention provides a method and system for synchronization of datasets across multicloud computing environments to enable simultaneous activation of datasets in multicloud environments.

Embodiments of the present invention address the problem of synchronization tools having limitations for catching up when updated or new files are added to a system, and can leave other environments in an out of sync condition. For instance, if an account balance or a field needs to be replicated across an internal cloud, the replication can include latency or latency issues. Thus, services relying on a datasets can be negatively impacted or fail. The latest source (e.g., source of truth) on the mainframe may not be synced to the other cloud environments. Thus, a technique for simultaneous activation of the source of truth is needed, and such a solution is provided by the embodiments for the present invention herein.

In an aspect according to the present invention, a computer-implemented method can include synchronization of datasets across cloud-based computer environments. The method includes generating, using a computer, a data map for each source dataset for a plurality of computing environments, respectively. The method further includes determining an activation function based on the data map, for simultaneously activating a new dataset of a source system from one of the plurality of computing environments. The method includes sharing a generation ID (identification) from the source system with one or more computing environments of the plurality of the computing environments, in response to receiving the activation function. The method includes replicating the new dataset of the source system across the one or more computing environments, in response to the sharing of the generation ID. The method includes activating a data synchronization trigger, using a synchronization coordinator module of the computer, in response to completing the replication of the new dataset; and completing the data synchronization across the plurality of computing environments, in response to the activation of the data synchronization trigger.

In a related aspect, the method includes monitoring, using the computer, streaming of the new dataset from the source system, and monitoring the ingestion of the new dataset in the computing environments, wherein the computing environments are cloud-based.

In a related aspect, the method includes calculating values for a synchronizing audit check field of the activation function by each of the computing environments using the activation function, in response to the activation of the data synchronization trigger.

In a related aspect, the method includes sharing the calculated values of the synchronization audit check field with a timestamp with the plurality of computing environments.

In a related aspect, the sharing of the values of the calculated synchronizing audit check field includes using a synchronization channel which provides secure communication, and/or another secure communication channel.

In a related aspect, the method further includes receiving validation from each of the plurality of computing environments that the new dataset ingestion is complete.

In a related aspect, the method further includes re-calculating values of the synchronizing audit check field, in response to the receiving of the validation.

In a related aspect, the method further includes sharing the re-calculated values as a communication between the plurality of computing environments.

In a related aspect, the sharing of the re-calculated values is on a common topic.

In a related aspect, the method further including the plurality of computing environments simultaneously making the new dataset visible within the plurality of computing environments, in response to the re-calculated values being the same.

In another aspect, a system using a computer for synchronization of datasets across cloud-based computer environments includes a computer system. The computer system comprises; a computer processor, a computer-readable storage medium, and program instructions stored on the computer-readable storage medium being executable by the processor, to cause the computer system to perform the following functions to; generate, using a computer, a data map for each source dataset for a plurality of computing environments, respectively; determine an activation function based on the data map, for simultaneously activating a new dataset of a source system from one of the plurality of computing environments; share a generation ID (identification) from the source system with one or more computing environments of the plurality of the computing environments, in response to receiving the activation function; replicate the new dataset of the source system across the one or more computing environments, in response to the sharing of the generation ID; activate a data synchronization trigger, using a synchronization coordinator module of the computer, in response to completing the replication of the new dataset; and complete the data synchronization across the plurality of computing environments, in response to the activation of the data synchronization trigger.

In a related aspect, a system further includes calculating values for a synchronizing audit check field of the activation function by each of the computing environments using the activation function, in response to the activation of the data synchronization trigger.

In a related aspect, a system further includes sharing the calculated values of the synchronizing audit check field with a timestamp with the plurality of computing environments.

In a related aspect, the sharing of the values of the calculated synchronizing audit check field includes using a synchronization channel which provides secure communication, and/or another secure communication channel.

In a related aspect, the system further includes receiving validation from each of the plurality of computing environments that the new dataset ingestion is complete.

In a related aspect, the system further includes re-calculating values of the synchronizing audit check field, in response to the receiving of the validation.

In a related aspect, the system further includes sharing the re-calculated values as a communication between the plurality of computing environments.

In a related aspect, the sharing of the re-calculated values is on a common topic.

In a related aspect, the system includes the plurality of computing environments simultaneously making the new dataset visible within the plurality of computing environments, in response to the re-calculated values being the same.

In another aspect according to the present invention, a computer program product synchronizes datasets across cloud-based computer environments. The computer program product includes a computer readable storage medium having program instructions embodied therewith. The program instructions executable by a computer to cause the computer to perform functions, by the computer, comprising the functions to; generate, using a computer, a data map for each source dataset for a plurality of computing environments, respectively; determine an activation function based on the data map, for simultaneously activating a new dataset of a source system from one of the plurality of computing environments; share a generation ID (identification) from the source system with one or more computing environments of the plurality of the computing environments, in response to receiving the activation function; replicate the new dataset of the source system across the one or more computing environments, in response to the sharing of the generation ID; activate a data synchronization trigger, using a synchronization coordinator module of the computer, in response to completing the replication of the new dataset; and complete the data synchronization across the plurality of computing environments, in response to the activation of the data synchronization trigger.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments and Examples

Figure 1:
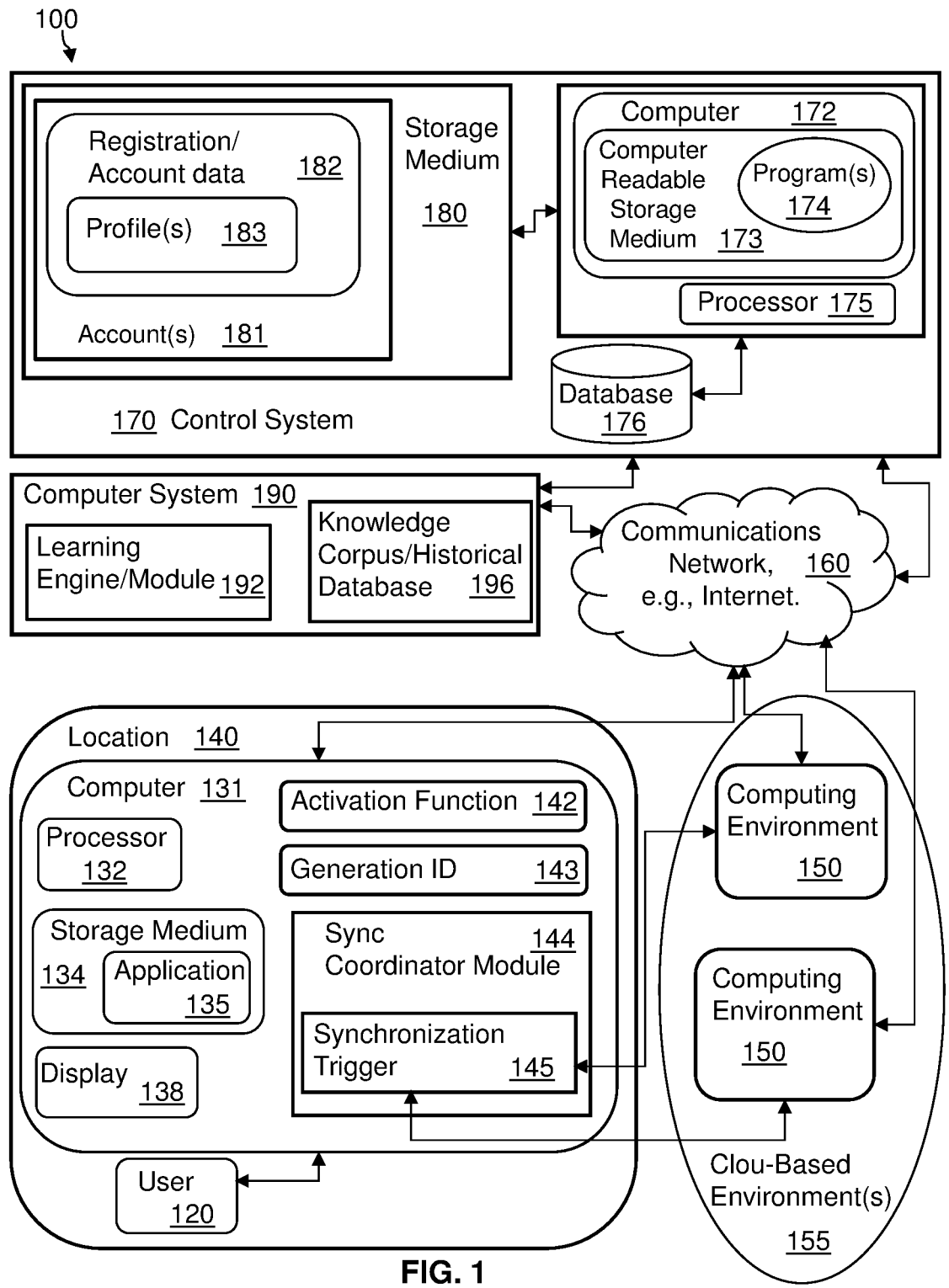
FIG. 1 is a schematic block diagram illustrating an overview of a system, system features or components, and methodology for synchronization of datasets across cloud-based computer environments, according to an embodiment of the present disclosure.
Figure 2:
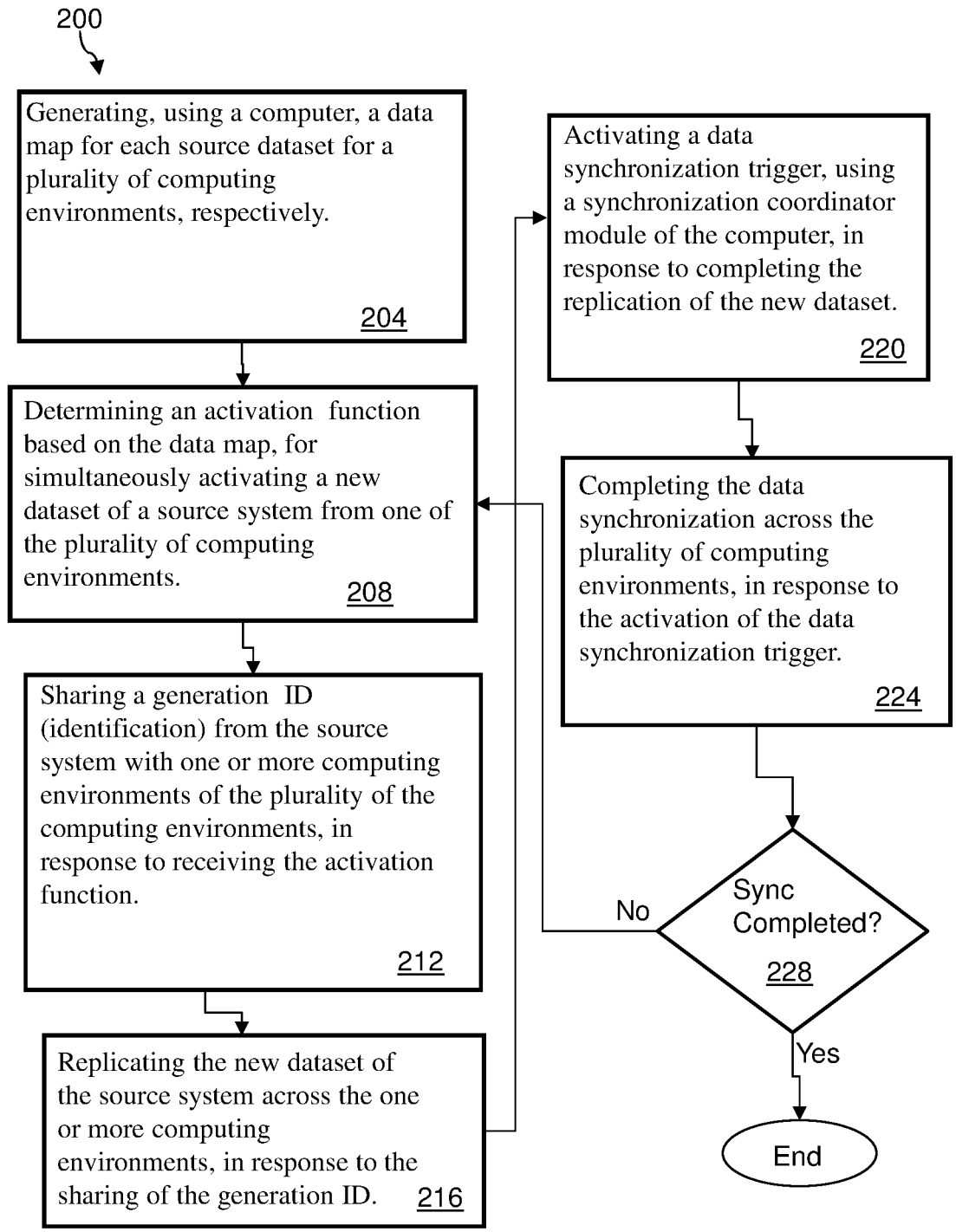
FIG. 2 is a flow chart illustrating a method, implemented using the system shown in FIG. 1, for synchronization of datasets across cloud-based computer environments, according to an embodiment of the present disclosure.
Figure 3:
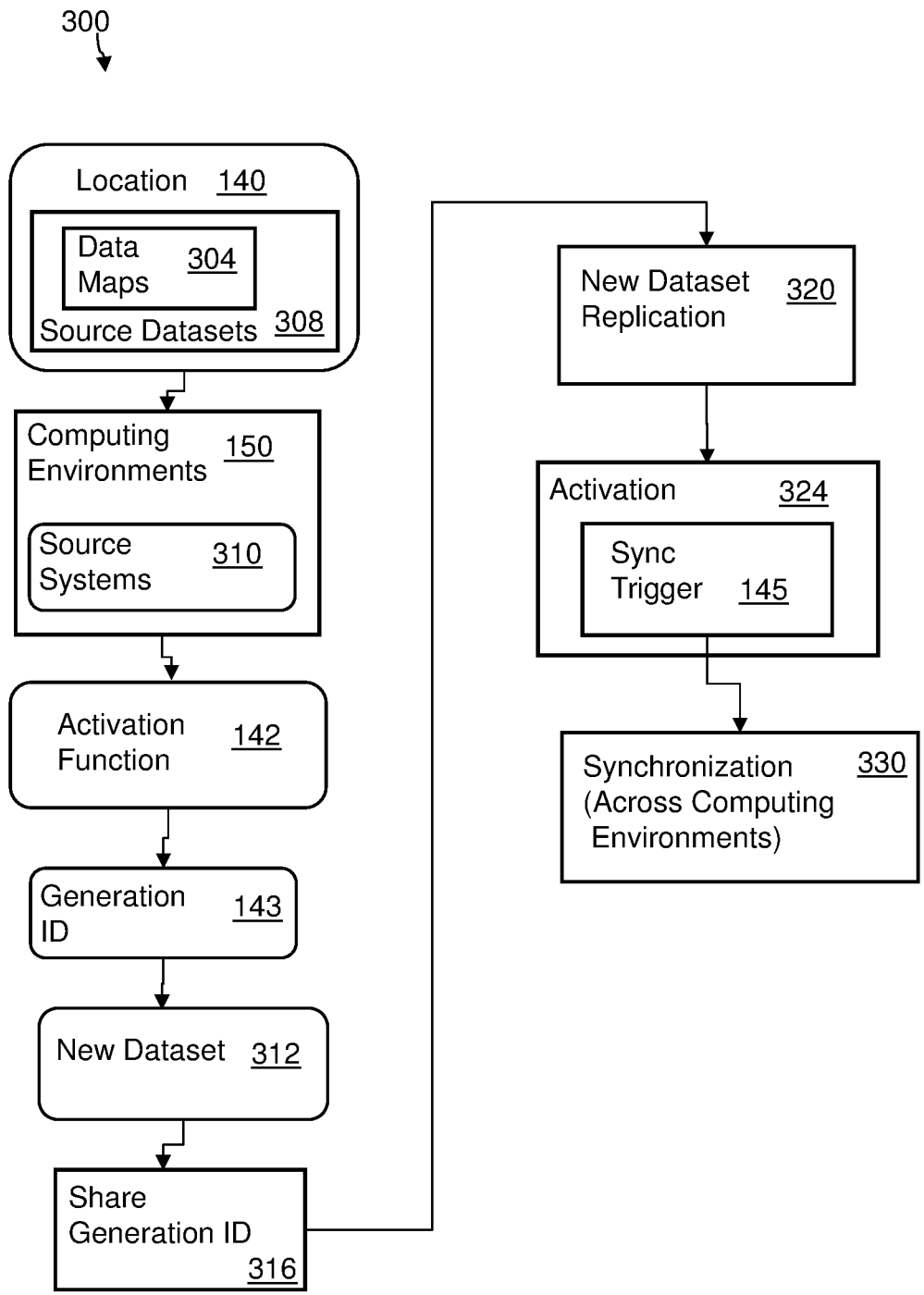
FIG. 3 is a functional schematic block diagram showing a series of operations and functional methodologies, for instructional purposes illustrating functional features of the present disclosure associated with the embodiments shown in the FIGS., which can be implemented, at least in part, in coordination with the system shown in FIG. 1, for synchronization of datasets across cloud-based computer environments.

Referring to FIGS. 1, 2 and 3, a computer-implemented method 200 and system 100 for synchronization of datasets across cloud-based computer environments 155 is disclosed.

Embodiments of the present disclosure include operational actions and/or procedures. The computer-implemented method 200 includes a series of operational blocks for implementing an embodiment according to the present disclosure which can include the system shown in FIG. 1. The operational blocks of the methods and systems according to the present disclosure can include techniques, mechanism, modules, and the like for implementing the functions of the operations in accordance with the present disclosure.

The method 200 includes generating, using a computer 131 at a location 140, a data map 304 for each source dataset 308 for a plurality of computing environments 150, respectively, as in block 204. The computing environments 150 can be cloud based 155. A computer 131, in one example can be part of a device, or a computer remote from the device 130. The computer 131 can communicate, all or in part with, a computer 172 which can be remote as part of a control system 170, or all or part of a remote server. The control system can include a computer 172 having a computer readable storage medium 173 which can store one or more programs 174, and a processor 175 for executing program instructions. The control system can also include a storage medium which can include registration and/or account data 182 and profiles 183 of users as part of user accounts 181. User accounts 181 can be stored on a storage medium 180 which is part of the control system 170. The user accounts 181 can include registrations and account data 182 and user profiles 183. The control system can also include a computer 172 having a computer readable storage medium 173 which can store programs or code embedded on the storage medium. The program code can be executed by a processor 175. The computer 172 can communicate with a database 176. The control system 170 can also include a database 176 for storing all or part of such data as described above, and other data.

The control system can also communicate with a computer system 190 which can include a learning engine/module 192 and a knowledge corpus or database 196. The computer system 190 can also communicate with the computer 131 and can be remote from the computer 131 or a user device. In another example, the computer system 190 can be all or part of the control system, or all or part of a device. The depiction of the computer system 190 as well as the other components of the system 100 are shown as one example according to the present disclosure.

The computer can include a processor 132 and a computer readable storage medium 134 where an application 135 can be stored which can in one example, embody all or part of the method of the present disclosure. The application can include all or part of instructions to implement the method of the present disclosure, embodied in code and stored on a computer readable storage medium. The computer can include a display 138. The computer 131 can operate, in all or in part, in conjunction with a remote server by way of a communications network 160, for example, the Internet. The computer 131 can be all or part of a device, such as a mobile device, for instance a mobile phone, or tablet, or in another example, a laptop computer.

Again referring to FIGS. 1, 2, and 3, the method 200 can include determining an activation function 142 based on the data map 304. The determining of the activation function is for simultaneously activating a new dataset 312 of a source system 310 (represented in FIG. 3 by block 310) from one of a plurality of computing environments 150 or another computing environment 150 (represented in FIG. 1 by block 150), as in block 208 of FIG. 2.

The method 200 includes sharing a generation ID (identification) 143 from the source system 310 with one or more computing environments 150 of the plurality of the computing environments 150, in response to receiving the activation function 142, as in block 212.

The method 200 includes replicating the new dataset 320 of the source system 310 across the one or more computing environments 150, in response to the sharing 316 of the generation ID 143, as in block 216.

The method 200 includes activating 324 a data synchronization trigger 145, using a synchronization coordinator module 144 of the computer 131, in response to completing the replication 320 of the new dataset 312, as in block 220.

The method 200 includes completing the data synchronization 330 across the plurality of computing environments 150, in response to the activation of the data synchronization trigger 145, as in block 224.

If the synchronization is not completed 228, the method can return to block 208 of the method 200. When the synchronization is completed 228, the method ends.

In one example, the method 200 can include monitoring, using the computer, streaming of the new dataset from the source system, and monitoring the ingestion of the new dataset in the computing environments, wherein the computing environments are cloud-based.

Figure 4:
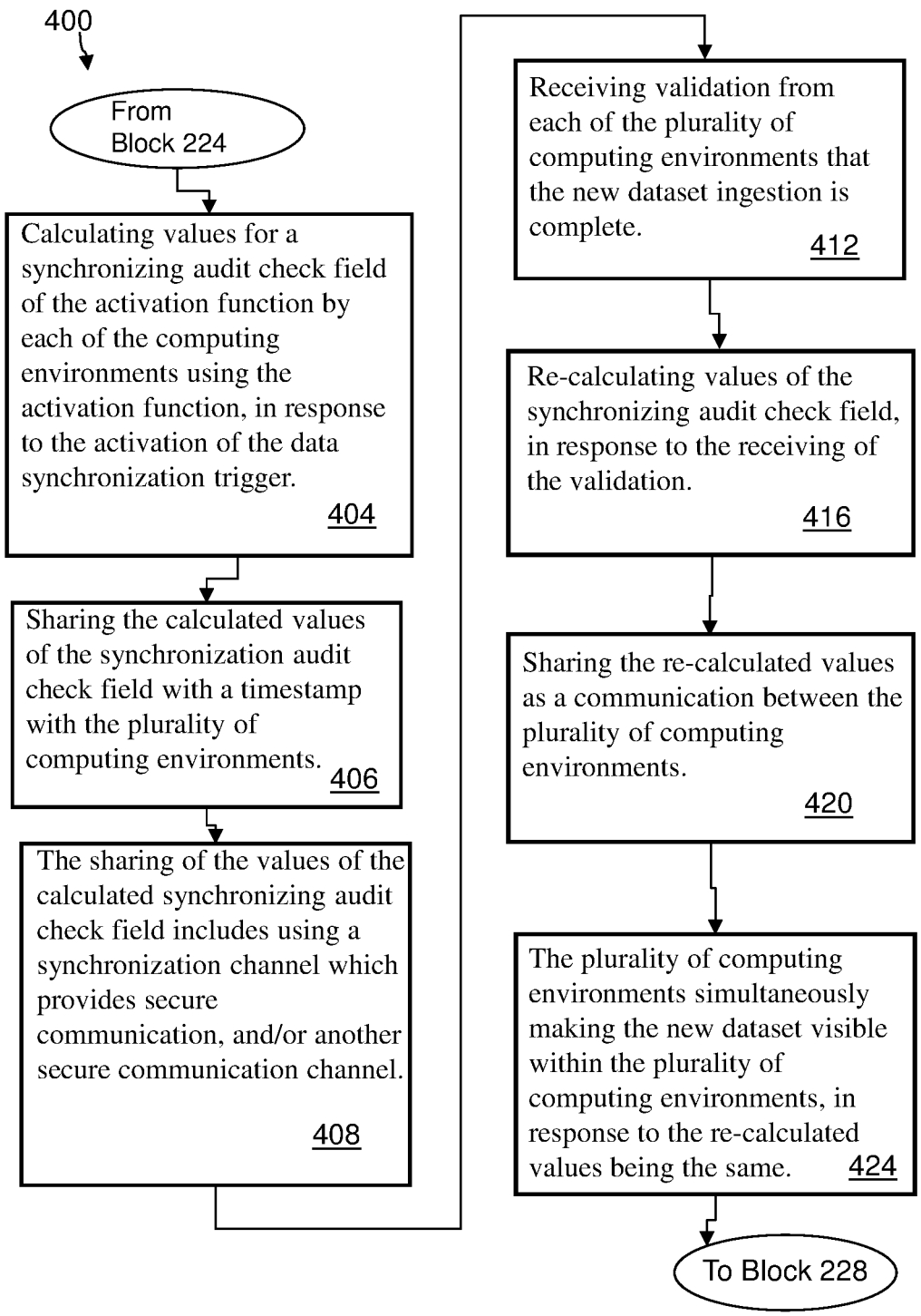
FIG. 4 is a flow chart illustrating another method, which continues from the flow chart of FIG. 2, for synchronization of datasets across cloud-based computer environments.

Referring to FIG. 4, in another embodiment according to the present disclosure, a method 400 continues from the method 200 shown in FIG. 2, and includes in response to the activation of the data synchronization trigger, calculating values for a synchronizing audit check field of the activation function by each of the computing environments using the activation function, as in block 404. The method 400 includes sharing the calculated values of the synchronization audit check field with a timestamp with the plurality of computing environments, as in block 406. The sharing of the values of the calculated synchronizing audit check field includes using a synchronization channel which provides secure communication, and/or another secure communication channel, as in block 408. The method includes receiving validation from each of the plurality of computing environments that the new dataset ingestion is complete, as in block 412. The method also includes re-calculating values of the synchronizing audit check field, in response to the receiving of the validation, as in block 416. The method further includes sharing the re-calculated values as a communication between the plurality of computing environments, as in block 420. In one example, the sharing of the re-calculated values can be on a common topic. The method 400 can include, in response to the re-calculated values being the same, the plurality of computing environments simultaneously making the new dataset visible within the plurality of computing environments, as in block 424. The method 400 can then proceed to block 228 of the method 200 which his shown in FIG. 2.

In one example, a model can be generated by a computer or an Artificial Intelligence (AI) system, as an output at least in part from an AI system analysis using machine learning. The computer 131 can use a knowledge corpus 196 to determine an activation function or a generation ID, as well as access a historical record. The knowledge corpus 196 can include a historical database.

Other Embodiments and Examples

Referring to FIG. 1, a device (not shown), also can be referred to as a user device or an administrator's device, can include the computer 131 having a processor 132 and a storage medium 134 where an application 135, can be stored. The application can embody the features of the method of the present disclosure as instructions. The user can connect to a learning engine 192 using the device and computer 131. The device which can include the computer 131 and a display or monitor 138, can include the application 135 and can embody the method of the present disclosure and can be stored on the computer readable storage medium 134. The device and computer 131 can further include the processor 132 for executing the application/software 135. The device and computer 131 can communicate with a communications network 160, e.g., the Internet.

It is understood that a user device and computer 131 is representative of similar devices which can be for other users, as representative of such devices, which can include, mobile devices, smart devices, laptop computers etc.

In one example, the system of the present disclosure can include a control system 170 communicating with the computer 131 via a communications network 160. The control system can incorporate all or part of an application or software for implementing the method of the present disclosure. The control system can include a computer readable storage medium 180 where account data and/or registration data 182 can be stored. User profiles 183 can be part of the account data and stored on the storage medium 180. The control system can include a computer 172 having computer readable storage medium 173 and software programs 174 stored therein. A processor 175 can be used to execute or implement the instructions of the software program. The control system can also include a database 176.

In another example and embodiment, profiles can be saved for users/participants. Such profiles can supply data regarding the user and history of deliveries for analysis. In one example, a user can register or create an account using the control system 170 which can include one or more profiles 183 as part of registration and/or account data 182. The registration can include profiles for each user having personalized data. For example, users can register using a website via their computer and GUI (Graphical User Interface) interface. The registration or account data 182 can include profiles 183 for an account 181 for each user. Such accounts can be stored on the control system 170, which can also use the database 176 for data storage. A user and a related account can refer to, for example, a person, or an entity, or a corporate entity, or a corporate department, or another machine such as an entity for automation such as a system using, in all or in part, artificial intelligence.

Additionally, the method and system is discussed with reference to FIG. 3, which is a functional system 300 which includes components and operations for embodiments according to the present disclosure, and is used herein for reference when describing the operational steps of the methods and systems of the present disclosure. Additionally, the functional system 300, according to an embodiment of the present disclosure, depicts functional operations indicative of the embodiments discussed herein.

More Embodiments and Examples

Figure 5:
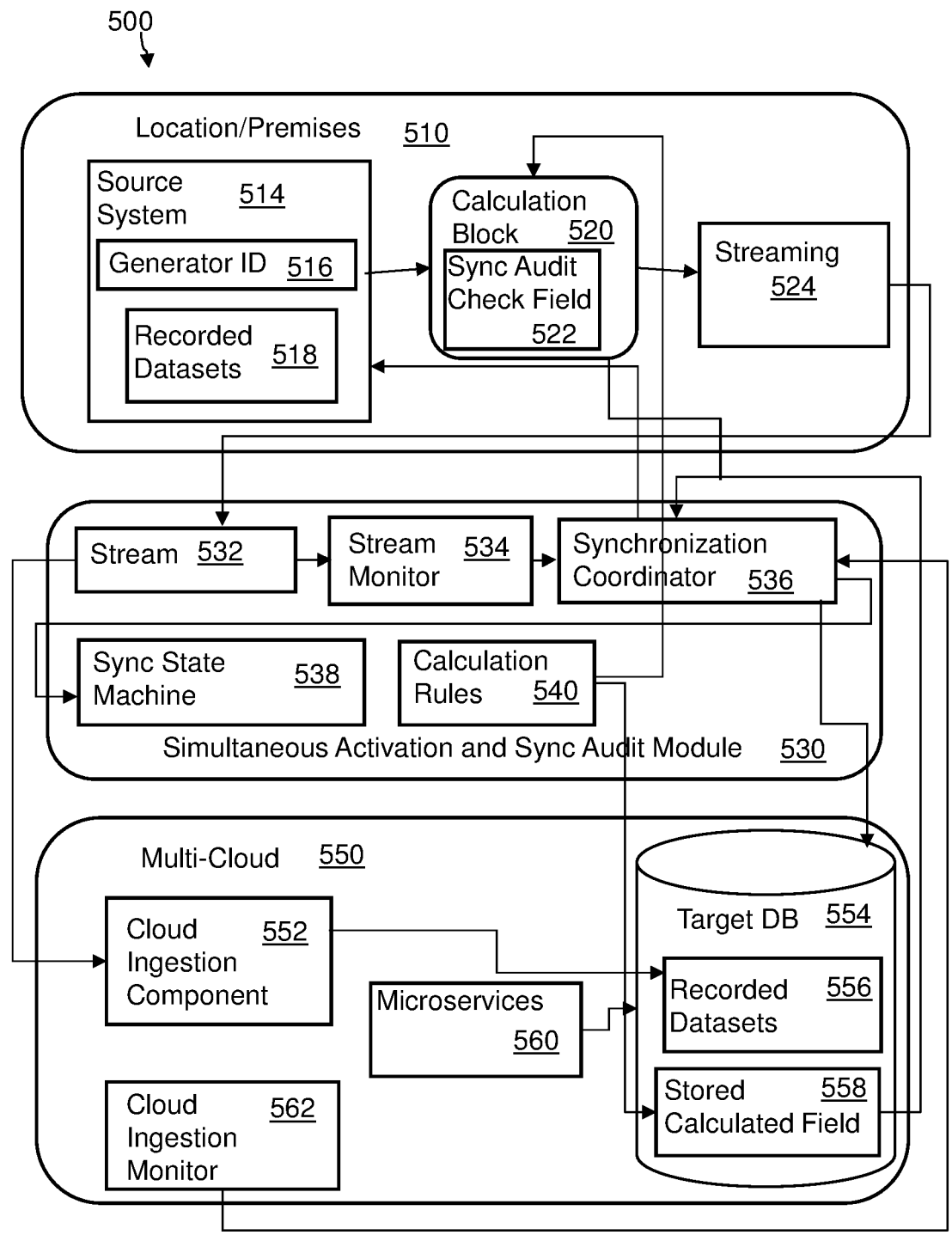
FIG. 5 is a block diagram illustrating another system according to an embodiment of the present invention, for synchronization of datasets across cloud-based computer environments.

Referring to FIG. 5, in one embodiment according to the present disclosure, a multicloud environment can synchronize data across cloud environments. The present disclosure enables synchronization for simultaneous activation of datasets in a multicloud environment.

For instance, a batch process can update several million account balances or fields for a banking solution. The process can run in an Enterprise Resource Management (ERP) or a mainframe computer, and the batch creates a new output file. When flipping to the new file, the new fields or balances are instantaneously available to the applications running in this environment.

Embodiments of the present disclosure include systems and methods for achieving synchronization in a multicloud environment. The systems and methods include techniques for synchronization and simultaneous activation of data sets across on-premises and/or multicloud environments. The systems and method include simultaneous activation and synchronization audit (SASA). The datasets can be tagged using a unique generation Identification (ID). The systems and methods can use a data synchronization (sync) trigger as part of sync coordinator component of a computer system that monitors data streaming from source and ingestion into a target computer.

The system can provide a way for a source computer to define a calculated field and function which can be leveraged by a target computer for quantitatively and qualitatively verifying the dataset synchronization correctness. The system can be deployed as a solution to synchronize as well as simultaneously activate datasets in multicloud environments. Thus, methods and solutions provide a unique way to tag the data set and its visibility through use of a generation ID.

Referring to FIG. 5, a system 500 and method according to an embodiment of the disclosure provides a technique for a user to select a dataset to be replicated across multiple computer (e.g., cloud computing) environments. The system can receive from a user data mapping for different computer environments for each source dataset. Post Data mapping, the user can define the data sync trigger, to simultaneously activate the new dataset in specific environments. The system can receive from the user a definition of a sync audit check field and function typically a calculated field based on the datasets exchanged. Before the data sync happens, the source system shares a generation ID with all the participating environments.

The system can start replicating the data across environments using a data synchronization model. The datasets received on the target environments are not visible to the end consumer until an activation is complete. Systems can use different native techniques to keep the latest data invisible and keep showing the previous data. For example, using a data version (with a generation ID) or using multiple databases and switching between the old and new data with ingested data, etc. using a DNS (Domain Name System), service mesh or load balancer.

On completion of the data push, the source system can activate the data sync trigger of a Synchronization (Sync) Coordinator module. The Sync Coordinator monitors the streaming from a source environment as well as the ingestion in the cloud environment. When, or in response to, the data sync trigger event activation, each target environment calculates the sync audit check field using the same function. The source environment shares the calculated sync audit field with a timestamp to the target environments. This can also be shared through the same synchronization channel or any other secure method.

When each environment validates the data ingestion is complete at their end up until the data sync trigger, they recalculate the sync audit field. Each target environment then shares calculated values on a common topic as a message. Once all the calculated values are the same, all the systems make the new dataset (for the specific generation ID) visible simultaneously. The system may also be optimized to do selective/random checks to check data sets have been synchronized correctly.

Thereby, source events can be processed through the pipeline with a generator ID (Identification) (e.g., a batch ID).

Again referring to FIG. 5, the system 500 includes a location or premises 510 having source events from a source system 514. The source system includes recorded datasets 518. The source events are processed through a pipeline, e.g., a streaming pipeline 524 with a generator ID 516 (Batch ID). A data set is passed-through a calculation block 520 that calculates checks sums based on calculation rules resulting in a synchronization audit check field 522. Rules can be dataset dependent.

The streaming from 524 continues to stream 532 feeding into a stream monitor 534 in a simultaneous activation and synchronization audit module 530. Calculated checksums are shared to a synchronization coordinator 536 and all participating environments, e.g., cloud based computing environments. Source events are published to streaming channel. The stream monitor 534 identifies and propagates to the sync coordinator 536 the following events: 1. a start of streaming with the new generator ID; 2. streaming errors; 3. end of streaming from on-premises environment 510.

Streamed events are received and pre-processed by a cloud ingestion component 552 in a multicloud computing environment 550. A cloud ingestion component 552 imports process data to the target database with the new generator ID so that data is not visible as per an active generator ID. A cloud ingestion monitor 562 tracks ingestion progress and identifies ingestion errors. The cloud ingestion monitor 562 emits an ingestion completion event to the sync coordinator 536. The sync coordinator 536 can use a state machine to identify next actions. A calculated field component 558 at a target database 554 can calculate a checksum of ingested data based on rules as in an on-premises database. The target database 554 can also use microservices 560. The target database 554 includes recorded datasets 556 and receives input from the cloud ingestion component 552. Checksum data can be sent to the sync coordinator 536 where it is compared to on-premises values. If all values match and no sync and ingestion errors occur, the sync coordinator can initiate a visibility switch update in a target database so new generator IDs becomes active. A sync audit can confirm to an on-premises system that streamed data can be activated.

In embodiments according to the present disclosure, a system or method if provided for accurate synchronization of datasets and activating the datasets simultaneously across on-premises multicloud environment to alleviate latency in data replication. More specifically, features can generate a unique identifier (ID) for each dataset to tag datasets with a generated unique ID, and share a tagged unique ID with one or more participating environments (on-premises and/or multicloud environment). Further, the system can include transmitting datasets to a calculation block to calculate checksums based on calculation rules which is dataset dependent and sharing the calculated checksums to a Sync Coordinator and all participating environments. The system can include monitoring data streaming from a source and ingesting to a target by triggering a data sync which is a part of the Sync Coordinator. The system can include leveraging a calculated field and function by a target for quantitatively and qualitatively verifying the correctness of dataset synchronization. The system can include defining when to activate the datasets simultaneously based on the dataset synchronization. The method and system can include leveraging a calculated field and function by a target for quantitatively and qualitatively verifying the correctness of dataset synchronization; and defining when to activate the datasets simultaneously based on the dataset synchronization.

According to embodiments of the present disclosure, a method and system includes a generator ID is used to determine the batch identifier. The method and system includes a sync audit which has a streaming monitor and ingestion monitor. Each integration or interaction can be monitored. The method and system can include actual data and the sync audit functions exposed to validate the effectiveness and efficiency of the synchronization process, resulting in an effective technique for implementing non-repudiation functions.

More Examples and Embodiments

Operational blocks and system components shown in one or more of the figures may be similar to operational blocks and system components in other figures. The diversity of operational blocks and system components depict example embodiments and aspects according to the present disclosure. For example, methods shown are intended as example embodiments which can include aspects/operations shown and discussed previously in the present disclosure, and in one example, continuing from a previous method shown in another flow chart.

Additional Examples and Embodiments

Figure 6:
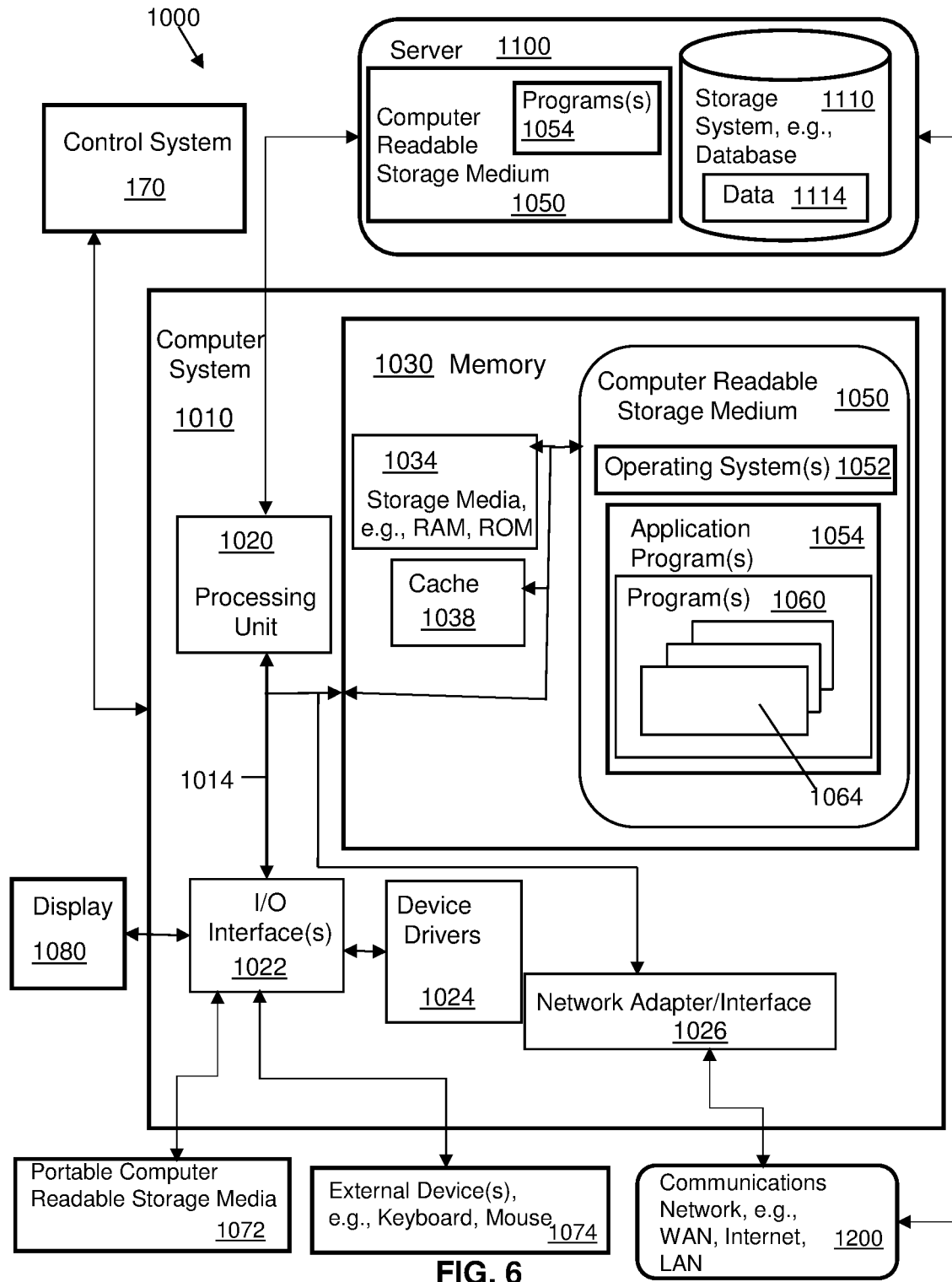
FIG. 6 is a schematic block diagram depicting a computer system according to an embodiment of the disclosure which may be incorporated, all or in part, in one or more computers or devices shown in FIG. 1, and cooperates with the systems and methods shown in the FIGS.

In the embodiment of the present disclosure shown in FIGS. 1 and 2, a computer can be part of a remote computer or a remote server, for example, remote server 1100 (FIG. 6). In another example, the computer 131 can be part of a control system 170 and provide execution of the functions of the present disclosure. In another embodiment, a computer can be part of a mobile device and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the device 130 can include a computer 131 having a processor 132 and a storage medium 134 which stores an application 135, and the computer includes a display 138. The application can incorporate program instructions for executing the features of the present disclosure using the processor 132. In another example, the mobile device application or computer software can have program instructions executable for a front end of a software application incorporating the features of the method of the present disclosure in program instructions, while a back end program or programs 174, of the software application, stored on the computer 172 of the control system 170 communicates with the mobile device computer and executes other features of the method. The control system 170 and the device (e.g., mobile device or computer) 130 can communicate using a communications network 160, for example, the Internet.

Thereby, the method 100 according to an embodiment of the present disclosure, can be incorporated in one or more computer programs or an application 135 stored on an electronic storage medium 134, and executable by the processor 132, as part of the computer on mobile device. For example, a mobile device can communicate with the control system 170, and in another example, a device such as a video feed device can communicate directly with the control system 170. Other users (not shown) may have similar mobile devices which communicate with the control system similarly. The application can be stored, all or in part, on a computer or a computer in a mobile device and at a control system communicating with the mobile device, for example, using the communications network 160, such as the Internet. It is envisioned that the application can access all or part of program instructions to implement the method of the present disclosure. The program or application can communicate with a remote computer system via a communications network 160 (e.g., the Internet) and access data, and cooperate with program(s) stored on the remote computer system. Such interactions and mechanisms are described in further detail herein and referred to regarding components of a computer system, such as computer readable storage media, which are shown in one embodiment in FIG. 6 and described in more detail in regards thereto referring to one or more computer systems 1010.

Thus, in one example, a control system 170 is in communication with the computer 131 or device 130, and the computer can include the application or software 135. The computer 131, or a computer in a mobile device 130 communicates with the control system 170 using the communications network 160.

In another example, the control system 170 can have a front-end computer belonging to one or more users, and a back-end computer embodied as the control system.

Also, referring to FIG. 1, a device 130 can include a computer 131, computer readable storage medium 134, and operating systems, and/or programs, and/or a software application 135, which can include program instructions executable using a processor 132. These features are shown herein in FIG. 1, and other similar components and features are also in an embodiment of a computer system shown in FIG. 6 referring to a computer system 1010, which may include one or more computer components.

The method according to the present disclosure, can include a computer for implementing the features of the method, according to the present disclosure, as part of a control system. In another example, a computer as part of a control system can work in corporation with a mobile device computer in concert with communication system for implementing the features of the method according to the present disclosure. In another example, a computer for implementing the features of the method can be part of a mobile device and thus implement the method locally.

Specifically, regarding the control system 170, a device(s) 130, or in one example devices which can belong to one or more users, can be in communication with the control system 170 via the communications network 160. In the embodiment of the control system shown in FIG. 1, the control system 170 includes a computer 172 communicating with a database 176 and one or more programs 174 stored on a computer readable storage medium 173. In the embodiment of the disclosure shown in FIG. 1, the device 130 communicates with the control system 170 and the one or more programs 174 stored on a computer readable storage medium 173. The control system includes the computer 172 having a processor 175, which also has access to the database 176.

The control system 170 can include a storage medium 180 for maintaining a registration 182 of users and their devices for analysis of the audio input. Such registration can include user profiles 183, which can include user data supplied by the users in reference to registering and setting-up an account. In an embodiment, the method and system which incorporates the present disclosure includes the control system (generally referred to as the back-end) in combination and cooperation with a front end of the method and system, which can be the application 135. In one example, the application 135 is stored on a device, for example, a computer or device on location, and can access data and additional programs at a back end of the application, e.g., control system 170.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, as in the example shown in FIG. 1 of a device 130 and computer 131 having the application 135. The application 135 is stored on the device or computer and can access data and additional programs at the back end of the application, for example, in the program(s) 174 stored in the control system 170.

The program(s) 174 can include, all or in part, a series of executable steps for implementing the method of the present disclosure. A program, incorporating the present method, can be all or in part stored in the computer readable storage medium on the control system or, in all or in part, on a computer or device 130. It is envisioned that the control system 170 can not only store the profile of users, but in one embodiment, can interact with a website for viewing on a display of a device such as a mobile device, or in another example the Internet, and receive user input related to the method and system of the present disclosure. It is understood that FIG. 1 depicts one or more profiles 183, however, the method can include multiple profiles, users, registrations, etc. It is envisioned that a plurality of users or a group of users can register and provide profiles using the control system for use according to the method and system of the present disclosure.

Still Further Embodiments and Examples

It is understood that the features shown in some of the FIGS., for example block diagrams, are functional representations of features of the present disclosure. Such features are shown in embodiments of the systems and methods of the present disclosure for illustrative purposes to clarify the functionality of features of the present disclosure.

The methods and systems of the present disclosure can include a series of operation blocks for implementing one or more embodiments according to the present disclosure. In some examples, operational blocks of one or more FIGS. may be similar to operational blocks shown in another figure. A method shown in one FIG. may be another example embodiment which can include aspects/operations shown in another FIG. and discussed previously.

Additional Embodiments and Examples

Account data, for instance, including profile data related to a user, and any data, personal or otherwise, can be collected and stored, for example, in the control system 170. It is understood that such data collection is done with the knowledge and consent of a user, and stored to preserve privacy, which is discussed in more detail below. Such data can include personal data, and data regarding personal items.

In one example a user can register 182 have an account 181 with a user profile 183 on a control system 170, which is discussed in more detail below. For example, data can be collected using techniques as discussed above, for example, using cameras, and data can be uploaded to a user profile by the user. A user can include, for example, a corporate entity, or department of a business, or a homeowner, or any end user.

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Similarly, data received by the system or inputted or received as an input is voluntary by one or more users, and thus initiated by and with the approval of the user. Thereby, a user can opt-in to input data according to the present disclosure. Such user approval also includes a user's option to cancel such profile or account, and/or input of data, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner. A user interface can also allow a user or an individual to remove all their historical data.

Other Additional Embodiments and Examples

In one example, Artificial Intelligence (AI) can be used, all or in part, for generating a model or a learning model as discussed herein in embodiments of the present disclosure. An Artificial Intelligence (AI) System can include machines, computer, and computer programs which are designed to be intelligent or mirror intelligence. Such systems can include computers executing algorithms. AI can include machine learning and deep learning. For example, deep learning can include neural networks. An AI system can be cloud based, that is, using a cloud-based computing environment having computing resources.

In another example, the control system 170 can be all or part of an Artificial Intelligence (AI) system. For example, the control system can be one or more components of an AI system.

It is also understood that the method 100 according to an embodiment of the present disclosure, can be incorporated into (Artificial Intelligence) AI devices, components or be part of an AI system, which can communicate with respective AI systems and components, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system, and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

It is understood that as discussed herein, a download or downloadable data can be initiated using a voice command or using a mouse, touch screen, etc. In such examples a mobile device can be user initiated, or an AI device can be used with consent and permission of users. Other examples of AI devices include devices which include a microphone, speaker, and can access a cellular network or mobile network, a communications network, or the Internet, for example, a vehicle having a computer and having cellular or satellite communications, or in another example, IoT (Internet of Things) devices, such as appliances, having cellular network or Internet access.

Further Discussion Regarding Examples and Embodiments

It is understood that a set or group is a collection of distinct objects or elements. The objects or elements that make up a set or group can be anything, for example, numbers, letters of the alphabet, other sets, a number of people or users, and so on. It is further understood that a set or group can be one element, for example, one thing or a number, in other words, a set of one element, for example, one or more users or people or participants. It is also understood that machine and device are used interchangeable herein to refer to machine or devices in one or more AI ecosystems or environments.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further Additional Examples and Embodiments

Referring to FIG. 6, an embodiment of system or computer environment 1000, according to the present disclosure, includes a computer system 1010 shown in the form of a generic computing device. The method 100, for example, may be embodied in a program 1060, including program instructions, embodied on a computer readable storage device, or a computer readable storage medium, for example, generally referred to as computer memory 1030 and more specifically, computer readable storage medium 1050. Such memory and/or computer readable storage media includes non-volatile memory or non-volatile storage, also known and referred to non-transient computer readable storage media, or non-transitory computer readable storage media. For example, such non-volatile memory can also be disk storage devices, including one or more hard drives. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that a control system 170, communicating with a computer system, can include all or part of the computer system 1010 and its components, and/or the control system can communicate with all or part of the computer system 1010 and its components as a remote computer system, to achieve the control system functions described in the present disclosure. The control system function, for example, can include storing, processing, and executing software instructions to perform the functions of the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

In an embodiment according to the present disclosure, one or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions. For example, in one embedment according to the present disclosure, a program embodying a method is embodied in, or encoded in, a computer readable storage medium, which includes and is defined as, a non-transient or non-transitory computer readable storage medium. Thus, embodiments or examples according to the present disclosure, of a computer readable storage medium do not include a signal, and embodiments can include one or more non-transient or non-transitory computer readable storage mediums. Thereby, in one example, a program can be recorded on a computer readable storage medium and become structurally and functionally interrelated to the medium.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Still Further Additional Examples and Embodiments

Figure 7:
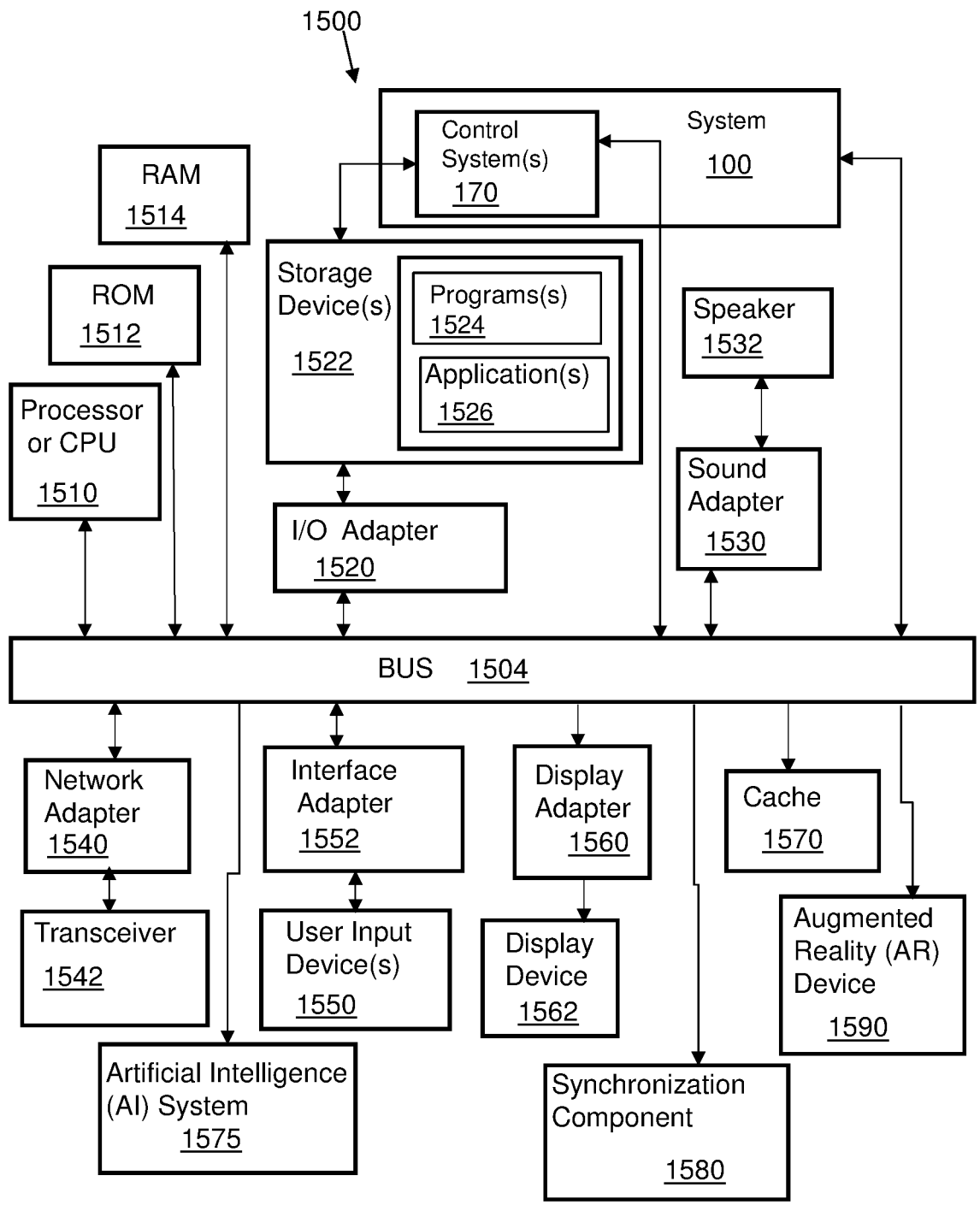
FIG. 7 is a schematic block diagram of a system depicting system components interconnected using a bus. The components for use, in all or in part, with the embodiments of the present disclosure, in accordance with one or more embodiments of the present disclosure.

Referring to FIG. 7, an example system 1500 for use with the embodiments of the present disclosure is depicted. The system 1500 includes a plurality of components and elements connected via a system bus 1504. At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500. An augmented reality (AR) device 1590 can also be operatively coupled to the bus 1504. A synchronization component 1580 can also be operatively coupled to the bus 1504. Such a synchronization component 1580 can incorporate all or part of embodiments of the present disclosure and discussed hereinbefore, and be computer implemented, in all or in part. An artificial intelligence (AI) system 1575 or an AI ecosystem can also be operatively coupled to the bus 1504.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure.

The system 1500 can include the control system 170 which is part of the system 100 (described in further detail hereinbefore) and can communicate with the system bus independently or as part of the system 100, and thus can communicate with the other components of the system 1500 via the system bus. In one example, the storage device 1522, via the system bus, can communicate with the control system 170 which has various functions as described in the present disclosure.

In one aspect, a speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

In another aspect, one or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

Other Aspects and Examples

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additional Aspects and Examples

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
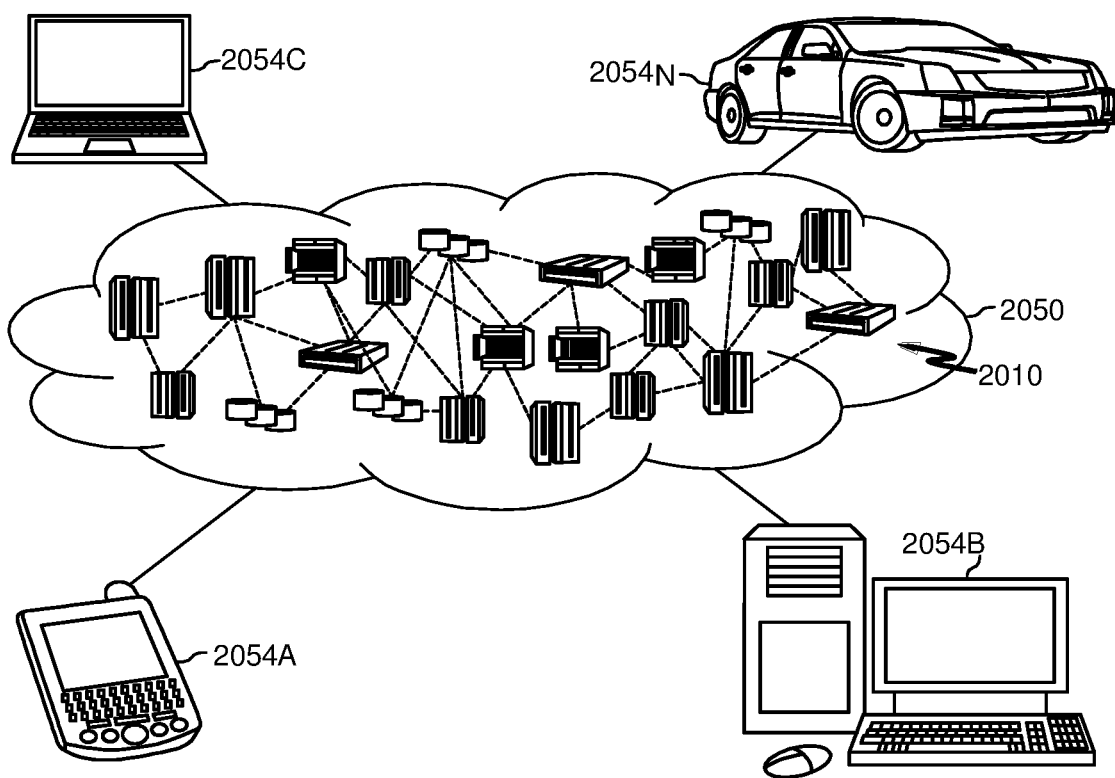
FIG. 8 is a block diagram depicting a cloud computing environment according to an embodiment of the present invention.

Referring now to FIG. 8, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 8 are intended to be illustrative only and that computing nodes 2010 and cloud computing environment 2050 can communicate with any type of computerized device over any type of network and/or network addressable connection (e.g., using a web browser).

Figure 9:
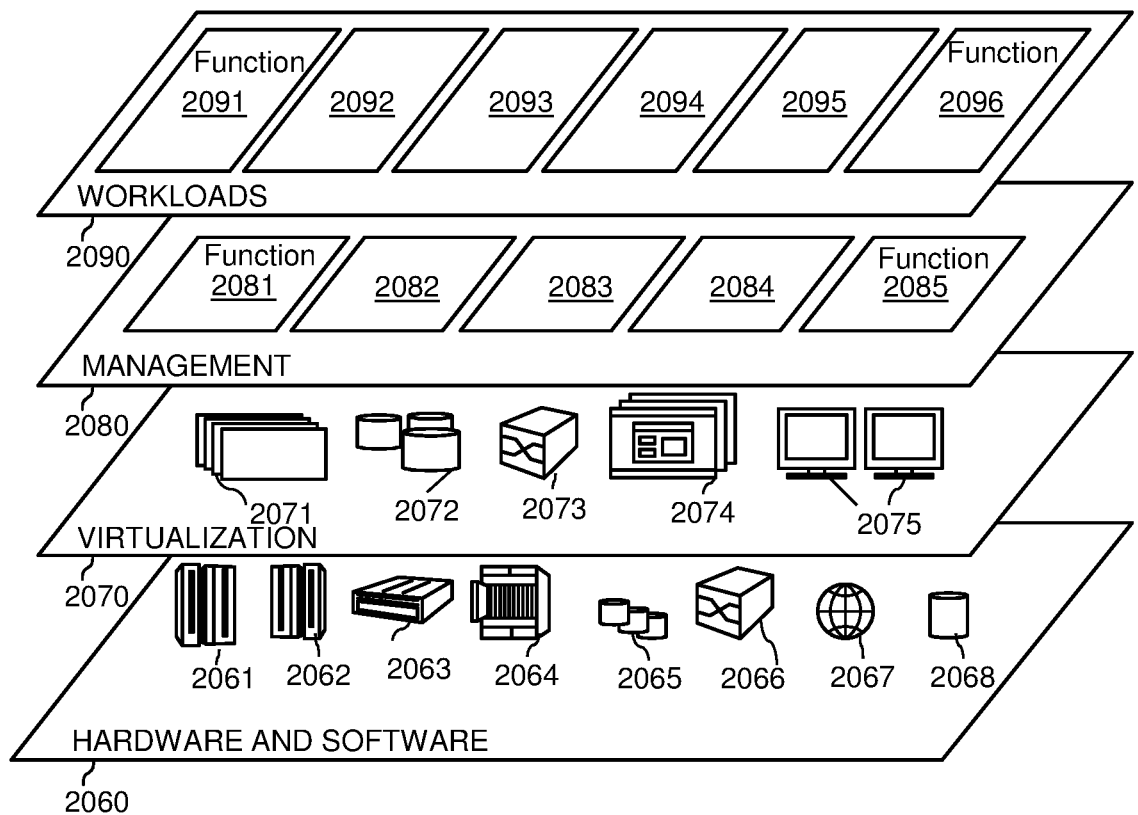
FIG. 9 is a block diagram depicting abstraction model layers according to an embodiment of the present invention.

Referring now to FIG. 9, a set of functional abstraction layers provided by cloud computing environment 2050 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and synchronization of datasets 2096, for example, synchronization of datasets across cloud-based computer environments.

What is claimed is:

1. A computer-implemented method for synchronization of datasets across cloud-based computer environments, comprising:
   generating, using a computer, a data map for each source dataset for a plurality of computing environments, respectively;
   determining an activation function based on the data map, for simultaneously activating a new dataset of a source system from one of the plurality of computing environments;
   sharing a generation ID (identification) from the source system with one or more computing environments of the plurality of the computing environments, in response to receiving the activation function;
   replicating the new dataset of the source system across the one or more computing environments, in response to the sharing of the generation ID;
   activating a data synchronization trigger, using a synchronization coordinator module of the computer, in response to completing the replication of the new dataset;
   completing the data synchronization across the plurality of computing environments, in response to the activation of the data synchronization trigger;
   sharing calculated values of a synchronization audit check field with a timestamp with the plurality of computing environments;
   receiving validation from each of the plurality of computing environments that ingestion of the new dataset is complete;
   re-calculating values of the synchronization audit check field, in response to the receiving of the validation; and
   in response to the re-calculated values being the same as the calculated values, the plurality of computing environments simultaneously making the new dataset visible within the plurality of computing environments.

2. The method of claim 1, further comprising:
   monitoring, using the computer, streaming of the new dataset from the source system, and monitoring the ingestion of the new dataset in the computing environments, wherein the computing environments are cloud-based.

3. The method of claim 1, further comprising:
   calculating values for a synchronizing audit check field of the activation function by each of the computing environments using the activation function, in response to the activation of the data synchronization trigger.

4. The method of claim 3, further comprising:
   sharing the calculated values of the synchronizing audit check field with a timestamp with the plurality of computing environments.

5. The method of claim 4, wherein the sharing of the values of the calculated synchronizing audit check field includes using a synchronization channel which provides secure communication, and/or another secure communication channel.

6. The method of claim 4, further comprising:
receiving validation from each of the plurality of computing environments that the new dataset ingestion is complete.

7. The method of claim 6, further comprising:
re-calculating values of the synchronizing audit check field, in response to the receiving of the validation.

8. The method of claim 7, further comprising:
sharing the re-calculated values as a communication between the plurality of computing environments.

9. The method of claim 8, wherein the sharing of the re-calculated values is on a common topic.

10. The method of claim 9, further comprising:
the plurality of computing environments simultaneously making the new dataset visible within the plurality of computing environments, in response to the re-calculated values being the same.

11. A system using a computer for synchronization of datasets across cloud-based computer environments, which comprises:
a computer system comprising; a computer processor, a computer-readable storage medium, and program instructions stored on the computer-readable storage medium being executable by the processor, to cause the computer system to perform the following functions to;
generate, using a computer, a data map for each source dataset for a plurality of computing environments, respectively;
determine an activation function based on the data map, for simultaneously activating a new dataset of a source system from one of the plurality of computing environments;
share a generation ID (identification) from the source system with one or more computing environments of the plurality of the computing environments, in response to receiving the activation function;
replicate the new dataset of the source system across the one or more computing environments, in response to the sharing of the generation ID;
activate a data synchronization trigger, using a synchronization coordinator module of the computer, in response to completing the replication of the new dataset;
complete the data synchronization across the plurality of computing environments, in response to the activation of the data synchronization trigger;
sharing calculated values of a synchronization audit check field with a timestamp with the plurality of computing environments;
receiving validation from each of the plurality of computing environments that ingestion of the new dataset is complete;
re-calculating values of the synchronization audit check field, in response to the receiving of the validation; and
in response to the re-calculated values being the same as the calculated values, the plurality of computing environments simultaneously making the new dataset visible within the plurality of computing environments.

12. The system of claim 11, further comprising:
calculating values for a synchronizing audit check field of the activation function by each of the computing environments using the activation function, in response to the activation of the data synchronization trigger.

13. The system of claim 12, further comprising:
sharing the calculated values of the synchronizing audit check field with a timestamp with the plurality of computing environments.

14. The system of claim 13, wherein the sharing of the values of the calculated synchronizing audit check field includes using a synchronization channel which provides secure communication, and/or another secure communication channel.

15. The system of claim 13, further comprising:
receiving validation from each of the plurality of computing environments that the new dataset ingestion is complete.

16. The system of claim 15, further comprising:
re-calculating values of the synchronizing audit check field, in response to the receiving of the validation.

17. The system of claim 16, further comprising:
sharing the re-calculated values as a communication between the plurality of computing environments.

18. The system of claim 17, wherein the sharing of the re-calculated values is on a common topic.

19. The system of claim 18, further comprising:
the plurality of computing environments simultaneously making the new dataset visible within the plurality of computing environments, in response to the re-calculated values being the same.

20. A computer program product for synchronization of datasets across cloud-based computer environments, the computer program product comprising a computer readable storage medium having program instructions embodied therewith, the program instructions executable by a computer to cause the computer to perform functions, by the computer, comprising the functions to;
generate, using a computer, a data map for each source dataset for a plurality of computing environments, respectively;
determine an activation function based on the data map, for simultaneously activating a new dataset of a source system from one of the plurality of computing environments;
share a generation ID (identification) from the source system with one or more computing environments of the plurality of the computing environments, in response to receiving the activation function;
replicate the new dataset of the source system across the one or more computing environments, in response to the sharing of the generation ID;
activate a data synchronization trigger, using a synchronization coordinator module of the computer, in response to completing the replication of the new dataset;
complete the data synchronization across the plurality of computing environments, in response to the activation of the data synchronization trigger;
sharing calculated values of a synchronization audit check field with a timestamp with the plurality of computing environments;
receiving validation from each of the plurality of computing environments that ingestion of the new dataset is complete;
re-calculating values of the synchronization audit check field, in response to the receiving of the validation; and
in response to the re-calculated values being the same as the calculated values, the plurality of computing environments simultaneously making the new dataset visible within the plurality of computing environments.

* * * * *